US010065260B2

(12) United States Patent
Hutchison et al.

(10) Patent No.: US 10,065,260 B2
(45) Date of Patent: Sep. 4, 2018

(54) SYSTEM AND METHOD FOR CONTROLLING AN ARC WELDING PROCESS

(71) Applicant: Illinois Tool Works Inc., Glenview, IL (US)

(72) Inventors: Richard Martin Hutchison, Iola, WI (US); Kevin Michael Scott, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1292 days.

(21) Appl. No.: 13/733,681

(22) Filed: Jan. 3, 2013

(65) Prior Publication Data

US 2014/0183176 A1     Jul. 3, 2014

(51) Int. Cl.
| B23K 9/10 | (2006.01) |
| B23K 9/095 | (2006.01) |
| B23K 9/32 | (2006.01) |

(52) U.S. Cl.
CPC ............. B23K 9/10 (2013.01); B23K 9/0956 (2013.01); B23K 9/322 (2013.01)

(58) Field of Classification Search
CPC .................................................. B23K 9/0956
USPC ............ 219/124.02, 130.01, 130.21, 137.71
See application file for complete search history.

(56) References Cited

U.S. PATENT DOCUMENTS

| 5,086,207 A * | 2/1992 | Deam ...................... 219/130.01 |
| 5,349,156 A * | 9/1994 | Madigan et al. ........ 219/130.01 |
| 6,744,012 B2 | 6/2004 | Ueda et al. |
| 2012/0291172 A1* | 11/2012 | Wills et al. ...................... 2/8.2 |

FOREIGN PATENT DOCUMENTS

| CN | 1714978 | 1/2006 |
| CN | 102470473 | 5/2012 |
| CN | 102554418 | 7/2012 |
| CN | 102596475 | 7/2012 |
| EP | 2286949 | 2/2011 |

OTHER PUBLICATIONS

International Search Report from PCT application No. PCT/US2013/077710 dated May 9, 2014, 12 pgs.

* cited by examiner

*Primary Examiner* — Tu B Hoang
*Assistant Examiner* — Thomas Ward
(74) *Attorney, Agent, or Firm* — McAndrews, Held & Malloy, Ltd.

(57) ABSTRACT

A welding system includes an electrode configured to be advanced toward a workpiece and a power supply configured to provide a flow of electricity to the electrode for generating a welding arc between the electrode and the workpiece. The welding system also includes a first sensor configured to sense a light intensity of the welding arc and a second sensor configured to sense a current provided to the electrode via the power supply. In addition, the welding system includes a controller communicatively coupled with the first and second sensors and configured to modify the light intensity with respect to the current. The controller is configured to control a welding parameter of the welding system based on the modified light intensity.

20 Claims, 7 Drawing Sheets

SYSTEM AND METHOD FOR CONTROLLING AN ARC WELDING PROCESS

BACKGROUND

The invention relates generally to welding systems and, more particularly, to controlling parameters of an arc welding process.

A wide range of welding systems and welding control regimes have been implemented for various purposes. In continuous welding operations, gas metal arc welding (GMAW) techniques allow for formation of a continuous weld bead by feeding filler material shielded by inert or active gas from a welding torch. Electrical power is applied to the welding wire and a circuit is completed through the workpiece to sustain an arc that melts the wire and the workpiece to form the desired weld. Certain related processes do not use shielding gas, and may rely upon constituents in the welding wire for forming and protecting the progressing weld.

In its various forms, GMAW welding involves application of controlled voltages and currents to a welding wire that forms an electrode and is advanced towards a workpiece to create an arc between the electrode and the workpiece. The wire electrode is typically fed by a wire feeder coupled to a welding power supply, although in some systems, the wire feeder may be integrated into the power supply, or wire may be fed by a welding torch (e.g., "spoolgun"). In general, the welding torch may be held and controlled by a human operator, or may be part of an automated system, typically manipulated by a robotic device. Welding parameters may be set for all of these processes, including current and voltage levels, wire feed speeds, and so forth. For manual applications, travel speed (the rate of advancement of the torch to create the weld) is regulated by the operator, while in automated applications, this may be set in advance for particular welds and workpieces.

In GMAW and related welding processes, various welding parameters are controlled to maintain a desired arc length of the welding arc between the electrode and the workpiece. A constant arc length can provide a relatively consistent weld bead profile and weld penetration depth, which may enhance certain structural and aesthetic qualities of the weld. GMAW welding systems generally utilize voltage feedback to maintain a uniform voltage drop across the welding arc, which roughly corresponds with a uniform arc length. Unfortunately, it is difficult to accurately determine the voltage drop across the welding arc due to changes in the extension of the electrode as it is advanced toward the workpiece, as well as other voltage drops that are difficult to account for.

BRIEF DESCRIPTION

In a first embodiment, a welding system includes an electrode configured to be advanced toward a workpiece and a power supply configured to provide a flow of electricity (AC, DC, pulse, etc.) to the electrode for generating a welding arc between the electrode and the workpiece. The welding system also includes a first sensor configured to sense a light intensity of the welding arc and a second sensor configured to sense a current provided to the electrode via the power supply. In addition, the welding system includes a controller communicatively coupled with the first and second sensors and configured to modify the light intensity with respect to the current. The controller is configured to control a welding parameter of the welding system based on the modified light intensity.

In another embodiment, a method includes detecting, via a light sensor, an intensity of light emitted from a welding arc produced between an electrode of a welding system and a workpiece. The method also includes detecting, via a current sensor, a current of electricity provided to the electrode from a power supply of the welding system. In addition, the method includes modifying, via control circuitry of the welding system, the detected intensity of light with respect to the detected current to determine a modified light intensity of the welding arc. Further, the method includes controlling a welding parameter of the welding system based on the modified light intensity.

In a further embodiment, a welding system includes control circuitry. The control circuitry is configured to receive a signal indicative of a light intensity of a welding arc between an electrode of the welding system and a workpiece, and to receive a signal indicative of a current of electricity supplied to the electrode for producing the welding arc. In addition, the control circuitry is configured to modify the signal indicative of the light intensity with respect to the signal indicative of the current. Further, the control circuitry is configured to provide a control signal to a power supply of the welding system based on the modified signal indicative of the light intensity.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure are directed toward systems and methods for controlling welding system parameters based on a sensed light intensity of the welding arc produced by the welding system. In addition to a light sensor used to detect the light intensity, the welding system includes a current sensor to determine the current flowing through the welding electrode to produce the arc. Control circuitry may receive signals corresponding to the detected light intensity and the detected current, and process the signals to determine a modified light intensity that is directly proportional to the length of the welding arc. This may involve modifying the detected light intensity with respect to the detected current. Since the modified light intensity corresponds with welding arc length, the welding system may utilize the modified light intensity as a primary feedback parameter to control the arc length. More specifically, the control circuitry may send control signals to power conversion circuitry for adjusting welding parameters. As a result, the power supply may provide power at a desired current and/or voltage to the electrode to maintain the welding arc at an appropriate arc length for the desired weld.

The modified light intensity may be a more accurate indicator of arc length than the voltage drop across system components, which is generally used in traditional welding systems. In such systems, control of the welding process would be achieved by maintaining weld voltage at a desired level. This voltage may include voltage drops across many different welding components, including welding leads, cable connections, a contact point in a welding torch contact tip, the extension of the electrode from the contact point, and so forth. However, voltage leads used to determine the voltage drop across the system may not be able to capture the voltage drop due to the contact point and the electrode extension. The voltage drop across the electrode extension varies throughout the welding operation, such that the detected voltage is not an entirely accurate indicator of arc length. Unlike the detected voltage, the modified light intensity changes in response to changes in electrode extension of the welding wire fed toward the workpiece. In this way, the modified light intensity calculated in presently disclosed embodiments may provide a better indicator of arc length than a detected voltage. In some embodiments, however, the voltage may still be monitored as an additional feedback parameter. The voltage signal may be utilized, for example, to detect corruption of the light intensity signal or to provide fine tuning of the welding parameter control.

Figure 1:
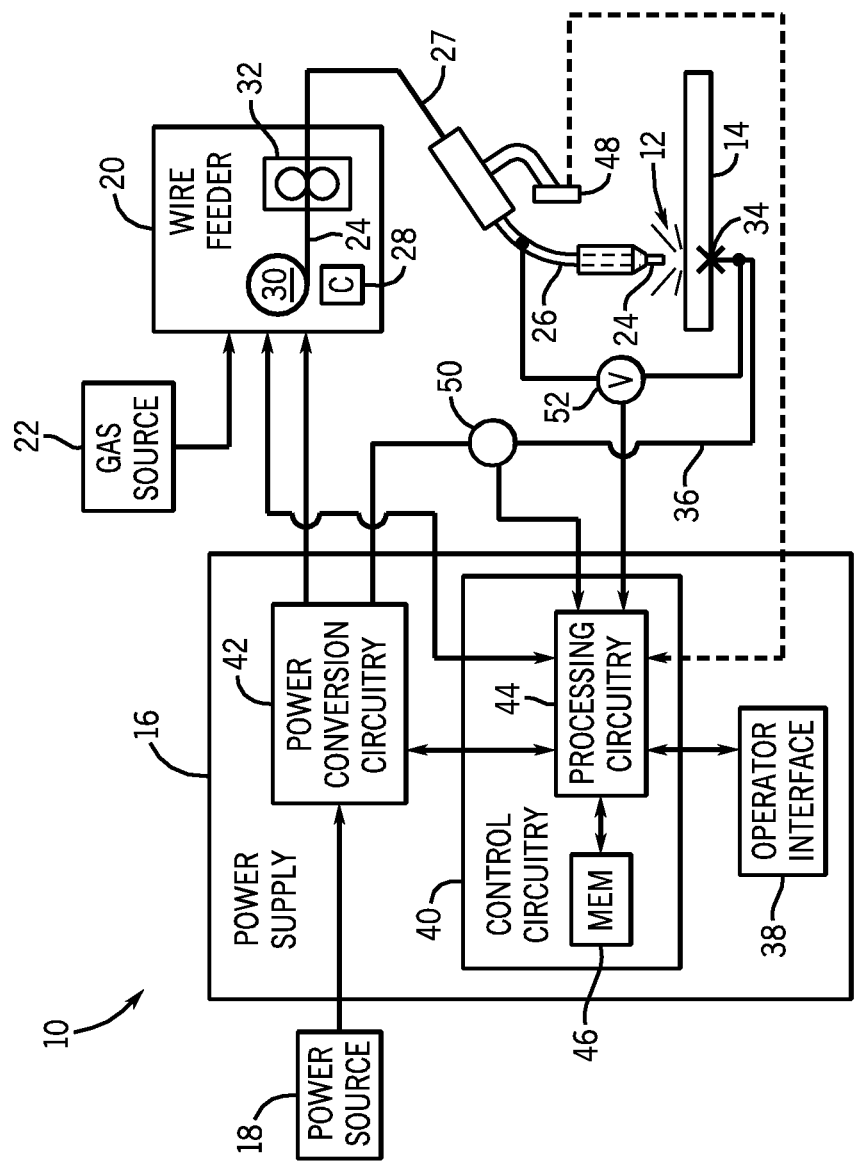
FIG. 1 is a block diagram of an embodiment of a welding system that may employ an arc light control system.

Turning now to the figures, FIG. 1 is a block diagram of an embodiment of a welding system 10 in accordance with present techniques. The welding system 10 is designed to produce a welding arc 12 on a workpiece 14. The welding arc 12 may be of any type of weld, and may be oriented in any desired manner, including MIG, metal active gas (MAG), various waveforms, tandem setup, and so forth. The welding system 10 includes a power supply 16 that may be coupled to a power source 18, such as a power grid. Other power sources may, of course, be utilized including generators, engine-driven power packs, and so forth. In the illustrated embodiment, a wire feeder 20 is coupled to a gas source 22 and the power supply 16, and supplies welding wire 24 to a welding torch 26 through a welding cable 27. The power supply 16 provides a flow of electricity to the welding wire 24, which acts as an electrode. The welding wire 24 is fed through the welding torch 26 to form the welding arc 12, melted by the welding arc 12, and deposited on the workpiece 14.

The wire feeder 20 will typically include control circuitry, illustrated generally by reference numeral 28, which regulates the feed of the welding wire 24 from a spool 30, and commands the output of the power supply 16. The spool 30 will contain a length of welding wire 24 that is consumed during the welding operation. The welding wire 24 is advanced by a wire drive assembly 32, typically through the use of an electric motor under control of the control circuitry 28. In addition, the workpiece 14 is coupled to the power supply 16 by a clamp 34 connected to a work cable 36 to complete an electrical circuit when the welding arc 12 is established between the welding wire 24 and the workpiece 14.

Placement of the welding torch 26 at a location proximate to the workpiece 14 allows electrical current, which is provided by the power supply 16 and routed to the welding torch 26, to arc from the welding wire 24 to the workpiece 14. As described above, this arcing completes an electrical circuit that includes the power supply 16, the welding torch 26, the workpiece 14, and the work cable 36. Particularly, in operation, electrical current passes from the power supply 16, to the welding torch 26, to the workpiece 14, which is typically connected back to the power supply 16. The arcing generates a relatively large amount of heat that causes part of the workpiece 14 and the filler metal of the welding wire 24 to transition to a molten state, thereby forming the weld.

To shield the weld area from being oxidized or contaminated during welding, to enhance arc performance, and to improve the resulting weld, the welding system 10 also may feed an inert shielding gas to the welding torch 26 from the gas source 22. It is worth noting, however, that a variety of shielding materials for protecting the weld location may be employed in addition to, or in place of, the inert shielding gas, including active gases and particulate solids.

The welding system 10 may be designed to allow data settings to be selected by the operator, particularly via an operator interface 38 provided on the power supply 16. The operator interface 38 may be incorporated into a front faceplate of the power supply 16, and may allow for selection of settings such as the type of weld process, the type of wire to be used, welding parameter settings, and so forth. These weld settings are communicated to control circuitry 40 within the power supply 16. It should be noted that while reference is made in the present disclosure to "GMAW" welding, the welding torch 26 and techniques described herein may be used with or without inert gas, such as with flux cored or metal cored wires.

The control circuitry 40 controls a welding parameter of the welding system 10. More specifically, the control circuitry 40 operates to control the welding power output that is applied to the welding wire 24 for carrying out the desired welding operation. Accordingly, the control circuitry 40 is coupled to power conversion circuitry 42. This power conversion circuitry 42 is adapted to receive power from the power source 18 to create the output power that will ultimately be applied to the welding wire 24 at the welding torch 26. Various power conversion circuits may be employed, including choppers, boost circuitry, buck circuitry, inverters, converters, and so forth.

The control circuitry 40 may control the power conversion circuitry 42 to adjust the output power in response to sensor feedback received from sensors located throughout the welding system 10. The sensors may provide signals relating to an operating parameter of the welding system, such as current, voltage, or light intensity of the welding arc 12. Based on these detected parameters, the control circuitry 40 may output control signals to the power conversion circuitry 42 to adjust a welding parameter. The welding parameter may include the current provided to the welding wire 24, the voltage of the flow of electricity provided to the welding wire 24, welding wire feed speed, or some combination thereof.

The control circuitry 40 may include processing circuitry 44 and memory circuitry 46, and may be communicatively coupled with various sensors. The processing circuitry 44 may receive feedback signals from a light sensor 48 used to detect a light intensity of the welding arc 12, and from a current sensor 50 configured to monitor a current provided to the welding wire 24 via the power supply 16. The light sensor 48 may represent a single sensor or an array of sensors used to detect the light emitted from the welding arc 12. In some embodiments, the processing circuitry may receive feedback signals from a voltage sensor 52 as well, the voltage sensor 52 being designed to measure a voltage drop between a contact point in the welding torch 26 and the workpiece 14. Based on the feedback signals received, the processing circuitry 44 may execute instructions stored in the memory circuitry 46 to generate one or more control signals to provide to the power conversion circuitry 42. According to the control signals, the power conversion circuitry 42 may continuously adjust parameters of the welding power supplied to the welding wire 24, in order to maintain a desired arc length of the welding arc 12. More specifically, the welding parameters may be adjusted to maintain the arc length within a range of approximately 0-10% of the desired arc length. The desired arc length may be based on inputs related to welding parameters and/or arc starting parameters, provided via the operator interface 38. The processing circuitry also may communicate with the control circuitry 28 of the wire feeder 20, providing control signals to adjust wire feed speed and/or receiving signals based on the wire feed speed. The various sensors may generate signals indicative of the different detected properties at a predetermined interval, and the processing circuitry may receive and process the sensor signals to output control signals nearly instantaneously. This may allow for relatively instantaneous control of the arc length of the welding arc 12 throughout the welding operation.

In present embodiments, the control circuitry 40 is configured to modify a signal indicative of light intensity of the welding arc 12 (e.g., from light sensor 48) with respect to a signal indicative of current supplied to the welding wire 24 (e.g., from sensor 50). This modified light intensity is a relatively good indicator of the arc length of the welding arc 12, because the light emitted from the welding arc 12, in general, is directly proportional to current and arc length within commercially relevant applications. The measured current may change with a change in electrode extension, or a distance the welding wire 24 protrudes from the welding torch 26. Because the welding wire 24 is continuously being advanced toward the workpiece 14 and is also being deposited onto the workpiece 14 as droplets, the electrode extension changes with respect to time. The control circuitry 40 adjusts for changes in arc length that result from a change in electrode extension by modifying the light intensity with respect to the current. As previously discussed, it is not possible to monitor the resulting changes in arc length using only voltage drop across the welding system 10.

The modification to the detected light intensity may include any number of adjustments to compensate for the detected current. The term modification may refer to any adjustment, derivation, compensation, or general relationship between the detected light intensity and the detected current used to control a welding parameter. For example, in some embodiments, the modification may involve using a lookup table in the control circuitry 40. The lookup table may include modified light intensity values, or light intensity offset values, corresponding to different detected current values (or ranges of current values). In other embodiments, the modification may include an equation that relates the detected light intensity and the detected current. The relationship between the light intensity and current may include a relative proportion, an offset, or some combination thereof.

In an embodiment described in detail below, the modification includes a normalization of the detected light intensity with respect to the detected current. This may result in a normalized light intensity. The control circuitry 40 may perform such normalization by dividing the detected light intensity by the detected current, scaled by a factor. Although described below in the context of a modification that normalizes the light intensity, the disclosed techniques may be applied with any appropriate modification of detected light intensity with respect to detected current.

The detected arc light intensity, normalized with respect to the detected current, may provide more effective control of the welding process, regardless of how hot the welding torch 26 is, the length or type of cabling used, or other voltage contributions. For example, as the distance (i.e., arc length) between the welding wire 24 and the weld puddle on the workpiece 14 approaches zero, the light intensity detected by the sensor 48 also approaches zero. This is in contrast to the voltage detected by the sensor 52, which still measures anode and cathode fall values that can add up to approximately 20 Volts.

As another example, the following derivation shows that the change in normalized light intensity of the welding arc 12 can be approximately ten times greater than the corresponding change in voltage measured for a given increase in arc length. Again, the normalized light intensity is directly proportional to welding arc length. The voltage drop from the contact tip of the welding torch 26 to the workpiece 14 is given by the following equation:

$$V_{tot} = V_{con} + V_{EE} + V_A + V_C + V_{arc}. \quad (1)$$

In equation 1, $V_{tot}$ is the total voltage drop. $V_{con}$, $V_{EE}$, $V_A$, $V_E$, and $V_{arc}$ represent the voltage drops across the contact tip of the welding torch 26, the electrode extension, the anode, the cathode, and the welding arc 12, respectively. For a given combination of the current provided to and electrode extension of the welding wire 24, the sum of the voltage drops across the other parts of the welding system 10 remain relatively constant:

$$\gamma = V_{con} + V_{EE} + V_A + V_C. \quad (2)$$

The magnitude of $\gamma$ may be approximately 20 Volts for a typical GMAW welding system. The voltage drop across the welding arc 12 is related to the arc length of the welding arc 12:

$$V_{arc} = \beta * l_{arc}. \quad (3)$$

In equation 3, $l_{arc}$ represents the welding arc length, and $\beta \cong 20V/in$. The light output from the welding arc 12 may be described according to the following equation:

$$L_{out} = \lambda * l_{arc}. \quad (4)$$

In equation 4, $L_{out}$ represents the light output and $\lambda$ represents the light output per unit length of the welding arc 12 per amp of current delivered across the welding arc 12. The percent change in voltage detected by the voltage sensor 52, then, for a given change in welding arc length is described in the following equation:

$$\%\Delta V = 100 * \left| \frac{V_1 - V_2}{V_1} \right| = 100 * \left[ \frac{(\gamma + \beta * l_{arc_1}) - (\gamma + \beta * l_{arc_2})}{(\gamma + \beta * l_{arc_1})} \right] \quad (5)$$

$$= \frac{100 * \beta * \Delta l_{arc}}{(\gamma + \beta * l_{arc_1})}$$

$$= \frac{100 * \Delta l_{arc}}{\left(\frac{\gamma}{\beta} + l_{arc_1}\right)}.$$

In equation 5, % $\Delta V$ is the percent voltage change, and $V_1$ and $V_2$ are the first and second measured voltages, respectively. $l_{arc_1}$, $l_{arc_2}$, and $\Delta l_{arc}$ are the first welding arc length, the second welding arc length, and the difference between the first and second welding arc lengths, respectively. As mentioned previously, both $\beta$ and $\gamma$ have approximately the same value (e.g., 20), so the equation may further simplify to the following:

$$\%\Delta V \cong \frac{100 * \Delta l_{arc}}{(1 + l_{arc_1})}. \qquad (6)$$

Equation 6 above represents the relationship between change in detected voltage and change in welding arc length. The following equation represents the relationship between change in light emitted from the welding arc 12 and change in welding arc length for a given welding current:

$$\%\Delta L = 100 * \frac{(\lambda * l_{arc_1} - \lambda * l_{arc_2})}{\lambda * l_{arc_1}} \qquad (7)$$

$$= \frac{100 * \Delta l_{arc}}{l_{arc_1}}.$$

The following two examples indicate the difference between using voltage as the feedback variable for controlling welding arc length and using arc light as the feedback variable for controlling welding arc length. The first example represents the respective changes in response to a change in the arc length from 0.12" to 0.10", or a 16.7% decrease:

$$\%\Delta V = \frac{100 * \Delta l_{arc}}{(1 + l_{arc_1})} = \frac{100 * .02}{1 + .02} = 1.67\%. \qquad (8)$$

$$\%\Delta L = \frac{100 * \Delta l_{arc}}{l_{arc_1}} = \frac{100 * .02}{.12} = 16.7\%. \qquad (9)$$

The next example represents the respective changes in response to a change in the arc length from 0.10" to 0.16", or a 60% increase:

$$\%\Delta V = \frac{100 * \Delta l_{arc}}{(1 + l_{arc_1})} = \frac{100 * .06}{1 + .06} = 5.66\%. \qquad (10)$$

$$\%\Delta L = \frac{100 * \Delta l_{arc}}{l_{arc_1}} = \frac{100 * .06}{.10} = 60.00\%. \qquad (11)$$

As shown in the examples above, the change in light intensity at a given weld current is proportional to the change in arc length of the welding arc 12. The arc light intensity (detected by the sensor 48) may be a more accurate indicator of arc length than the detected voltage alone.

Figure 2:
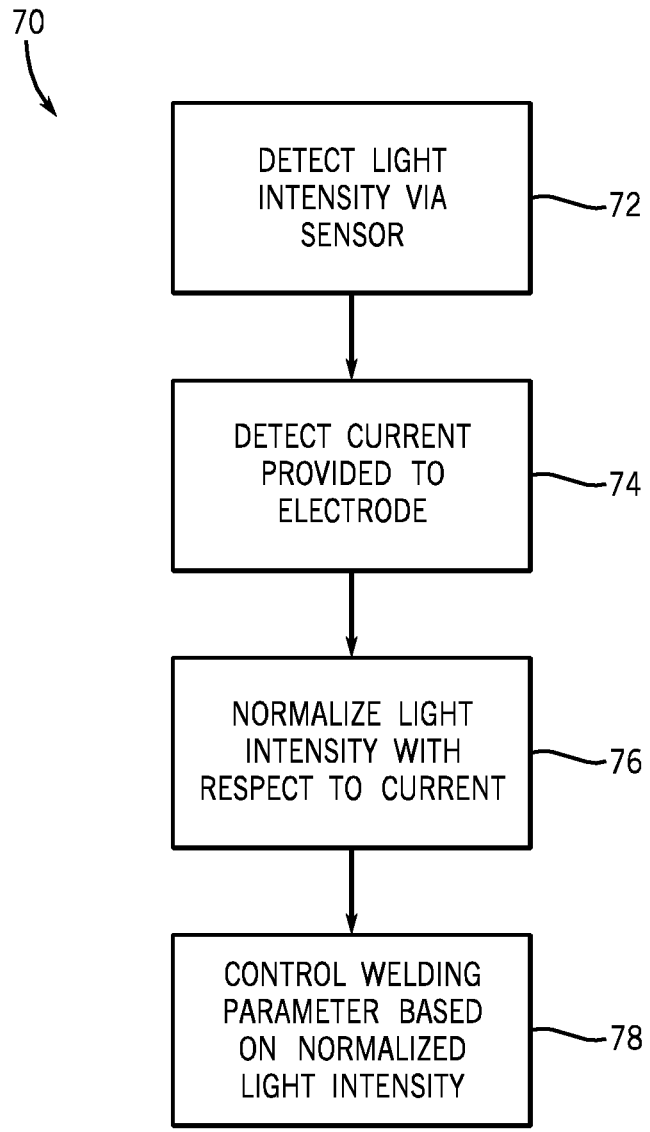
FIG. 2 is a process flow diagram of an embodiment of a method for operating the welding system of FIG. 1.

FIG. 2 is a process flow diagram of an embodiment of a method 70 for operating the welding system 10. The method 70 includes detecting (block 72) a light intensity of the welding arc 12 via the light sensor 48 and detecting (block 74) a current provided to the electrode (e.g., welding wire 24) via the current sensor 50. In addition, the method 70 includes normalizing (block 76) the detected light intensity with respect to the detected current via the control circuitry 40, to determine a normalized light intensity of the welding arc 12. The method 70 further includes controlling (block 78) a welding parameter (e.g., current or voltage output from the power supply 16, etc.) based on the normalized light intensity. Other variations and/or additions to this method 70 may be used to control welding processes in a wide range of welding applications, as described in detail below.

Normalizing (block 76) the light intensity signal may be useful for maintaining a desired welding arc length because of the relationship between arc length, arc light intensity, and current flowing through the welding arc 12. As shown in the derivation above, the detected light intensity is generally proportional to the welding arc length for any given level of current. More specifically, at any given current, every volumetric element of the welding arc 12, which is a column of plasma reaching between the welding wire 24 and the workpiece 14, emits an amount of light that is proportional to the temperature of that element. As arc length increases, the number of volumetric elements of the welding arc 12 increases and, consequently, the amount of emitted light increases proportionally. The resulting relationship between the total light emitted and the arc length is provided in the following equation:

$$L_{out}(l_{arc}) = \lambda * l_{arc} * P(I). \qquad (12)$$

In equation 12, $\lambda$ represents the number of light elements per unit length, and P(I) represents the light output per volumetric element at a current I. If the arc length is held constant, as desired for controlling a welding operation, the light output per volumetric element increases in proportion to the amount of current flowing therethrough, in accordance with the following equation:

$$P(I) = \eta * I_{arc}. \qquad (13)$$

In equation 13, $\eta$ represents the light emitted per volumetric element per amp. As a result, equation 13 can be substituted into equation 12 to yield the following equation relating welding light intensity to welding arc length and current:

$$L_{out}(l_{arc}, I_{arc}) = \lambda * l_{arc} * \eta * I_{arc}. \qquad (14)$$

It should be noted that equation 14 above is independent of any change in voltage drop across the welding arc 12 due to changes in electrode extension. However, the current flowing across the welding arc 12 may change with the electrode extension of the welding wire 24. As the welding wire 24 extends further from the welding torch 26, for example, Joule heating within the welding wire 24 may increase. As a result, less energy is used to melt and transfer the welding wire 24 to the weld pool, and this reduces the welding current across the welding arc 12. Since the light intensity is proportional to weld current, as shown in equation 14, the light output of the welding arc 12 would lower even if there is no change in arc length. To provide appropriate control of the welding arc length, therefore, it may be desirable to normalize the light intensity with respect to the current, as described above in reference to the method 70. This normalization is detailed in the following equation:

$$L_{out}^*(l_{arc}, I_{arc}) = \frac{\lambda * l_{arc} * \eta * I_{arc}}{\eta * I_{arc}}. \quad (15)$$

In equation 15, $L^*_{out}$ represents the normalized light intensity. Specifically, the light intensity of equation 14 is divided by the detected current through the welding arc 12, scaled by the factor η. Equation 15 reduces to equation 16 below, which directly relates the normalized light intensity to the arc length control variable. The normalized light intensity may be directly proportional to arc length, making it a more accurate feedback variable than a detected voltage drop.

$$L^*_{out}(l_{arc}) = \lambda * l_{arc}. \quad (16)$$

Because the normalized light intensity is highly sensitive to changes in welding arc length, it may offer more precise control in certain GMAW welding contexts, such as pulse spray GMAW welding processes. Such welding processes cycle between high and low welding current provided to the electrode, often using rectangular pulse methods. However, the sensitive control offered through the arc light intensity feedback may enable production of an adaptive pulse waveform via a sine wave superimposed over an average welding current. Using a single frequency sine waveform to drive the welding process may offer advantages over conventional rectangular pulses. For example, the sine wave control may yield decreased levels of broad spectrum electromagnetic noise because of the gradual ramping up to and down from peak pulse amperage. The reduction in electromagnetic noise may lead to a reduction in the audible noise output from the system when pulsing at a particular frequency. In addition, the smooth transition from an initial current to peak current and back may decrease undesired melting that would otherwise occur at the tip of the welding wire 24.

The method 70 may be used to provide continuous adjustments to the sine waveform to address changes in arc length, as identified via the normalized light intensity measurement. In some embodiments, the normalized light intensity control may adjust welding parameters in response to arc length changes resulting from droplet detachment. That is, as the welding wire 24 melts at the contact tip, droplets of the melted welding wire 24 are released and deposited into the weld on the workpiece 14. As the droplets are released, reducing the arc length, the control circuitry 40 may increase the current flowing to the welding wire 24, thereby facilitating droplet transfer. Droplet transfer is generally not encouraged in this way in conventional welding systems that rely on voltage feedback to control the welding parameters. Instead of increasing the current to release the droplet, such systems would decrease the current in response to a detected voltage increase due to droplet formation.

Figure 3:
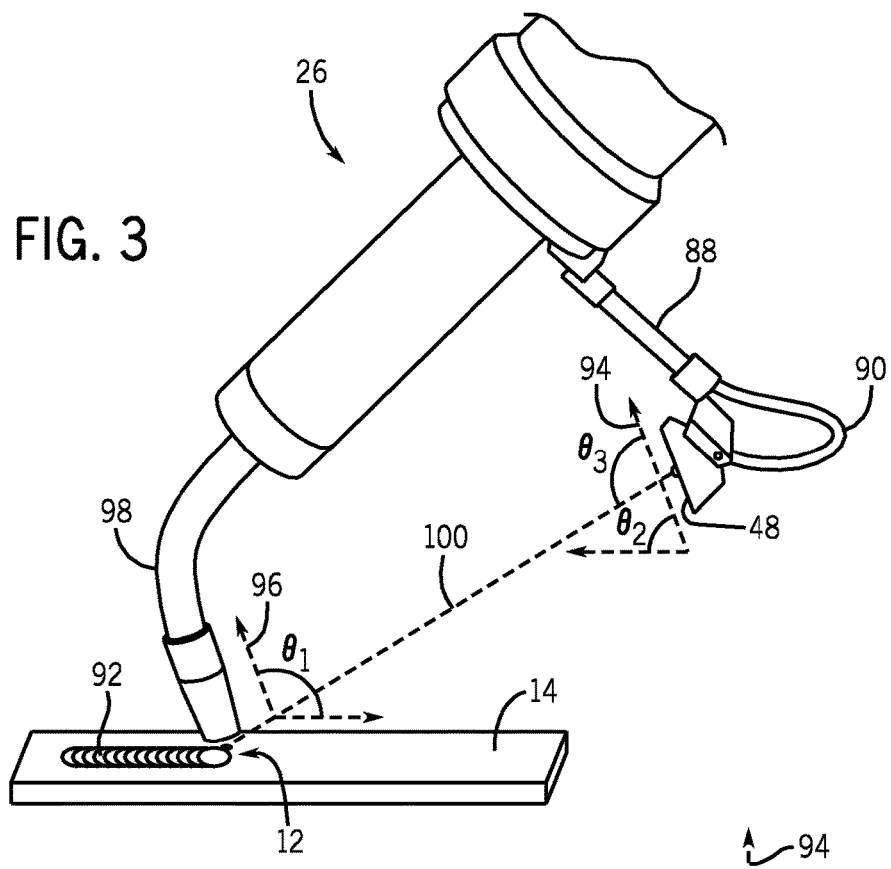
FIG. 3 is a perspective view of an embodiment of a light sensor mounted on a welding torch.

FIG. 3 is a perspective view of an embodiment of the welding torch 26 having the light sensor 48 mounted to the welding torch 26 via a mounting apparatus 88. Light from the welding arc 12 may be intercepted by the light sensor 48, which converts the detected light intensity to an electronic signal that is sent to the control circuitry 40 for processing. In the illustrated embodiment, the light sensor 48 communicates the feedback signal to the control circuitry 40 via a wire 90, which may extend through the weld cable 27 and from the wire feeder 20 to the power supply 16. In other embodiments, however, the light sensor 48 may communicate the signal wirelessly. The control circuitry 40 may normalize the signal with respect to a detected current flowing through the welding wire 24, and provide control signals to the power conversion circuitry 42 based on the normalized light intensity. The power conversion circuitry 42 may then adjust the power output to the welding wire 24 to maintain a desired arc length and, consequently, a consistent weld bead 92.

The light sensor 48 may include any device capable of outputting an electrical signal in response to incident light. For example, the light sensor 48 may include one or more photovoltaic cells, photodiodes, photo-resistive elements, or a combination thereof. In some embodiments, the light sensor 48 may be configured to output an electrical signal that is linearly proportional to the detected light. In other embodiments, non-linearity within the light sensor 48 may be mapped to a corresponding linearizing function via the control circuitry 40.

The light sensor 48 may be mounted to the welding torch 26 via the mounting apparatus 88 in a specific location and orientation relative to the welding arc 12. The position and/or shape of the welding arc 12 may vary throughout the welding process, especially with changes in electrode extension of the welding wire 24. For example, the position of the welding arc 12 relative to the welding torch 26 may change by up to approximately one inch due to the varying electrode extension. The light sensor 48, therefore, may be configured to consistently detect the light intensity emitted from the welding arc 12, regardless of the exact position of the welding arc 12 relative to the welding torch 26 at a given moment. The light sensor 48 may be mounted in a position relative to the welding torch 26 so that an axis 94 of the detection surface of the light sensor 48 is parallel to an axis 96 aligned with a nozzle 98 of the welding torch 26. As a result, angles $\theta_1$ and $\theta_2$ of these axes 96 and 94 relative to the workpiece 14 may be supplementary angles. In addition, the light sensor 48 may be mounted and/or adjusted to provide a desired angle of incidence $\theta_3$ of light on the light sensor 48, or the angle between the axis 94 and a line 100 from the light sensor 48 to the welding arc 12. A distance of the line 100, as well as the angle of incidence $\theta_3$, may be adjusted to ensure that all of the light emitted from the welding arc 12 is captured on the detection surface of the light sensor 48 without being obscured by the weld puddle on the workpiece 14 or any system components.

Figure 4:
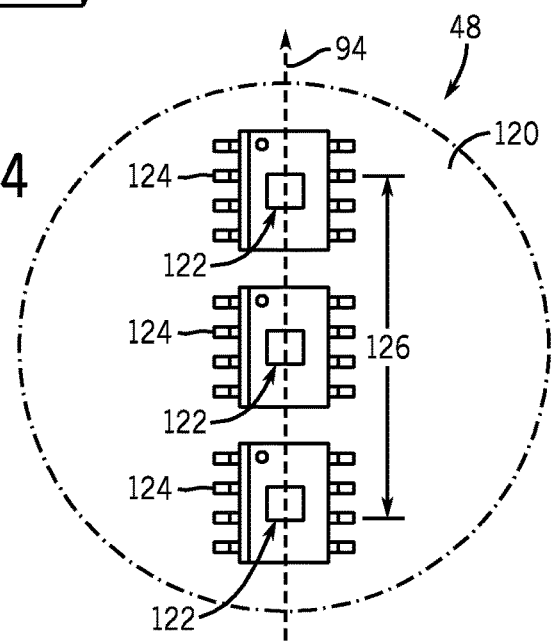
FIG. 4 is a front view of an embodiment of a sensor used to detect a light intensity of a welding arc.

FIG. 4 shows an embodiment of the light sensor 48, from a view that is normal to a detection surface 120 of the light sensor 48. In the illustrated embodiment, the light sensor 48 includes a linear array of three photovoltaic sensors 122, each located on a separate chip 124. The chip 124 may include circuitry configured to convert incident light detected by the connected photovoltaic sensors 122 into an electrical signal. The photovoltaic sensors 122 may be electrically connected in series, so that the signals indicative of the amount of light that reaches each of the photovoltaic sensors 122 may be combined into one electrical signal that is output from the light sensor 48. The detection surface 120, or housing, to which the photovoltaic sensors 122 are mounted may be circular, as illustrated, or any other desired shape. The photovoltaic sensors 122 are arranged linearly along the axis 94, which is substantially parallel (e.g., within a tolerance of less than approximately 1-2 degrees in certain embodiments) with the axis 96 and, thus, substantially parallel with the welding wire 24 exiting via the nozzle 98. The photovoltaic sensors 122 may be arranged such that a longitudinal distance 126 between the top and bottom edges of the sensor array is at least a desired distance. This desired distance may be related to an expected variation in electrode extension of the welding wire 24, so that the photovoltaic sensors 122 detect light from the entire length of the welding arc 12, even as the location of the welding arc 12 shifts relative to the light sensor 48. Other embodiments of the light sensor 48 may include different numbers, types, and arrangements of sensing elements used to produce a signal indicative of the total light intensity given off by the welding arc 12.

The light emitted from the welding arc 12 may be so intense that it could potentially saturate the photovoltaic sensors 122, especially when a relatively high current is maintained across the welding arc 12. To keep the photovoltaic sensors 122 from becoming completely saturated, the light sensor 48 may include neutral density filters over the photovoltaic sensors 122. In other embodiments, the distance from the light sensor 48 to the welding arc 12 (e.g., line 100) may be increased, the angle of incidence $\theta_3$ may be changed, and/or the angle $\theta_1$ of the welding torch 26 relative to the workpiece 14 may be changed to reduce the likelihood of compete saturation.

Figure 5:
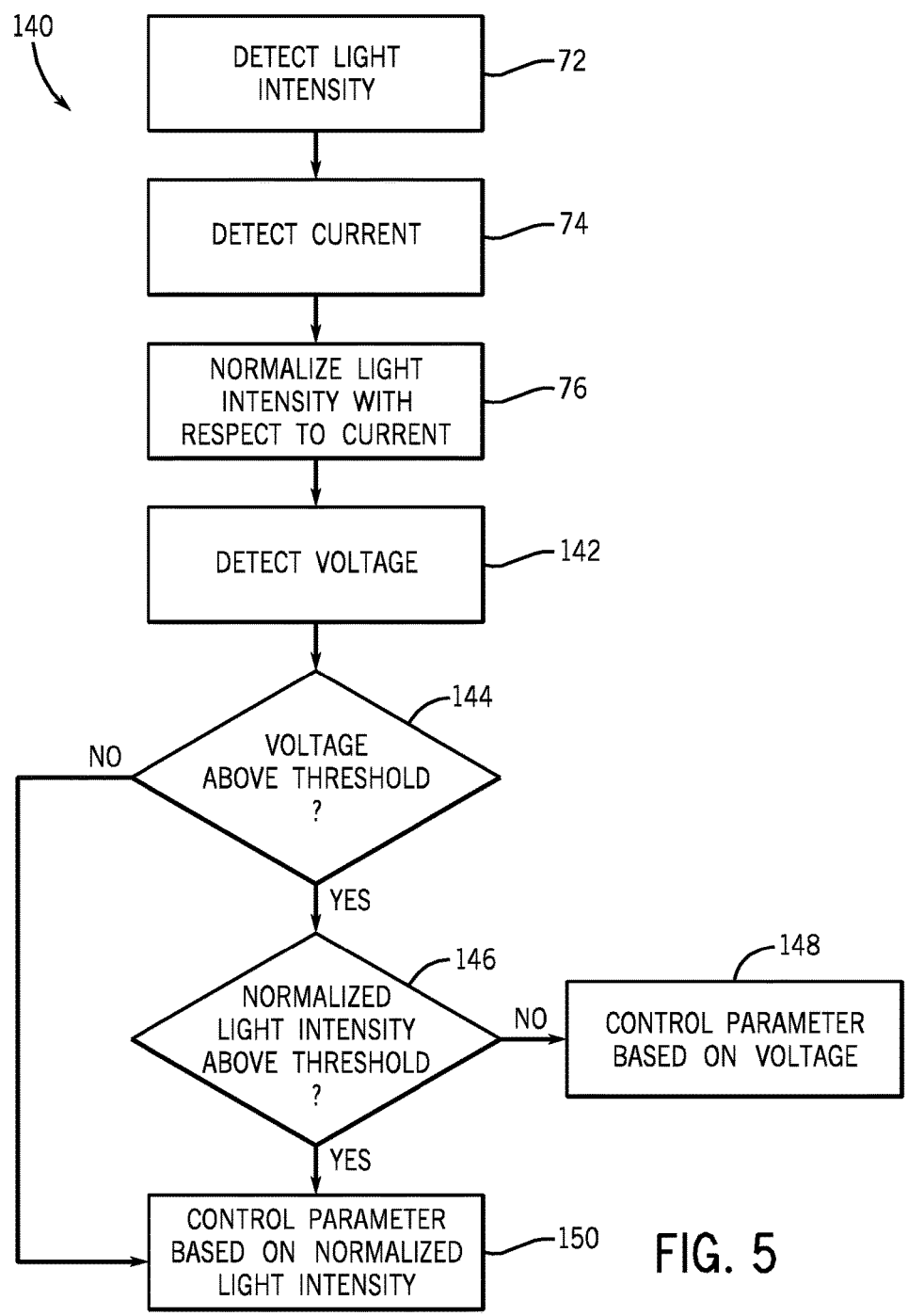
FIG. 5 is a process flow diagram of an embodiment of a method for operating the welding system of FIG. 1.

In addition to using just the normalized light intensity to control a welding parameter, some embodiments of the welding system 10 may use voltage feedback in combination with the normalized light intensity to provide feedback control of a welding process. As an example of this type of control, FIG. 5 is a process flow diagram of an embodiment of a method 140 for operating the welding system 10 based on a detected light intensity, a detected current, and a detected voltage. The method 140 includes detecting (block 72) the light intensity via the light sensor 48, detecting (block 74) the current via the current sensor 50, and normalizing (block 76) the detected light intensity with respect to the detected current, as described in detail in reference to the method 70 of FIG. 2. The method 140 also includes detecting (block 142) a voltage of the electricity provided to the welding wire 24 from the power supply 16 via the voltage sensor 52. This detected voltage may include the voltage drop between the contact point in the welding torch 26 and the work cable 36. The voltage sensor 52 may send a signal indicative of the detected voltage to the control circuitry 40 for processing along with the normalized light intensity.

The rest of the method 140 includes controlling (by providing control signals to the power conversion circuitry 42) a welding parameter (e.g., current, voltage, etc.) based on both the detected voltage and the normalized light intensity. In certain embodiments, the method 140 includes determining (block 144) whether the detected voltage is above a pre-determined threshold. The method 140 also may include determining (block 146) whether the normalized light intensity is above a pre-determined threshold.

The blocks 144 and 146 may represent the control circuitry 40 evaluating the two input signals (normalized light intensity and arc voltage) and determining which signal should be considered valid. In some embodiments, the control circuitry 40 may evaluate control signals that are calculated based on these input signals to determine which control signal should be sent to the power conversion circuitry 42. For example, if the signal indicative of the detected voltage is above the voltage threshold, but the signal indicative of the normalized light intensity is not above the light intensity threshold, then the control circuitry 40 may control (block 148) the welding parameter based on the detected voltage. This may occur when the control circuitry 40 determines, based on the normalized light intensity, that the light emitted from the welding arc 12 is blocked from the field of view of the light sensor 48. For example, the welding torch 26 may be oriented relative to the workpiece 14 in such a way that a portion of the workpiece 14 blocks the welding arc light from reaching the light sensor 48. As a result, the light detected by the light sensor 48 and, consequently, the normalized light intensity is not above a threshold value. However, because of the voltage drop across the welding arc 12, the voltage sensor 52 may detect a voltage that is above the corresponding voltage threshold. At this point, the welding system 10 may treat the detected light signal as corrupted. Instead of increasing the power supplied to the welding wire 24 in response to the low normalized light intensity, which could potentially overheat the welding wire 24, the control circuitry 40 may switch to voltage feedback control. The control circuitry 40 may provide a control signal, based on the detected voltage, to the power conversion circuitry 42 for welding parameter adjustments. The voltage feedback may be used until a time when the normalized light intensity returns to a normal level (above its threshold), indicating that it is no longer blocked or corrupted. In this way, the voltage measurement acts as a failsafe to the light intensity measurement.

When both the detected voltage and the normalized light intensity are determined (blocks 144 and 146) to be above their respective threshold values, the method 140 may include controlling (block 150) the welding parameter based on the normalized light intensity. The voltage measurement acts as a confirmation that the normalized light intensity is valid. The normalized light intensity may then be used as the control input because it is a relatively more accurate indicator of welding arc length than the detected voltage, as discussed above.

If the detected voltage is determined (block 144) to be below the voltage threshold value, this may indicate a short circuit. The welding system 10 may, as a result of this determination, clear the short by applying a control signal based on the normalized light intensity. Other embodiments of the welding system 10 may clear the short by switching to the voltage feedback in order to run a short clearing routine, such as a regulated metal deposition process.

The detected voltage may be used by the control circuitry 40 to perform other control functions, other than a failsafe for the normalized light intensity signal. For example, the control circuitry 40 may provide signals for controlling the welding arc 12 based on a hybrid control using information from the light sensor 48, current sensor 50, and voltage sensor 52. As an example, the normalized light intensity may be used in conjunction with the detected voltage to control a regulated metal deposition (RMD) process. The RMD process may control the power output such that the welding wire 24 short circuits the welding arc 12. In such processes, the voltage drop across the welding arc 12 may provide information relating to necking of the molten column of material dropping from the welding wire 24. The normalized light intensity may be used to maintain the desired welding arc length throughout this process, while the detected voltage may be used to monitor parameters related to the metal deposition. Consequently, the RMD process may take advantage of the relatively sensitive response to changes in arc length while still maintaining control of metal deposition. Voltage feedback may enhance the control available through the normalized light intensity in other welding applications as well. For example, the control circuitry 40 may primarily rely on the normalized light intensity feedback signals to control the power output, and may fine tune the weld current based on electrode extension information that can be determined from the detected voltage.

Figure 6:
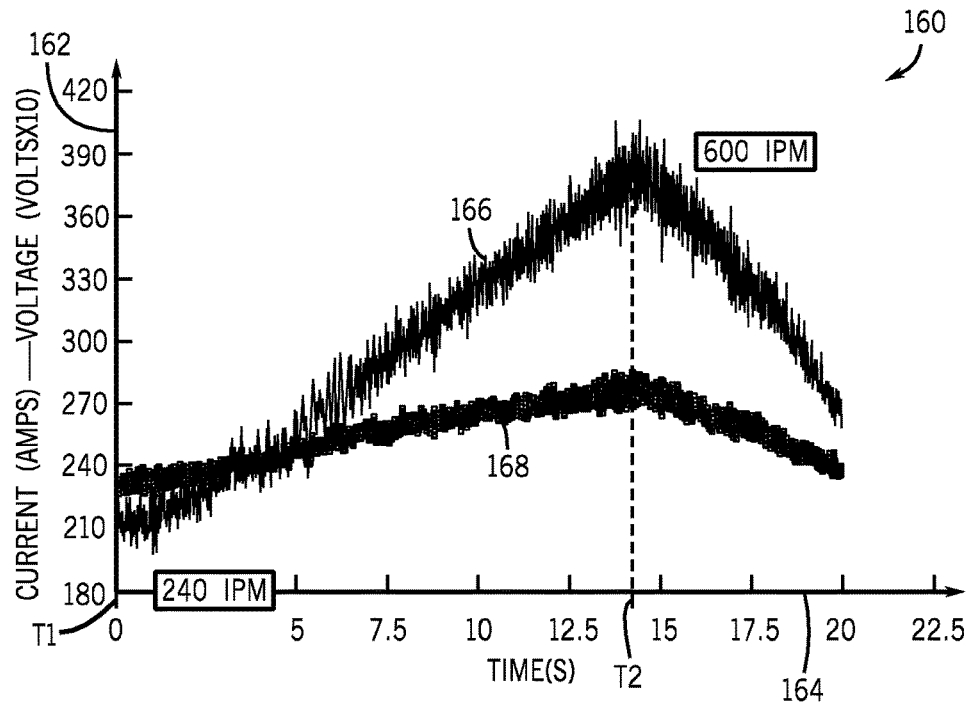
FIG. 6 is a plot of an embodiment illustrating automatic adjustments to welding parameters in response to a change in wire feed speed.

By normalizing the detected light intensity with respect to the detected current, it is possible to maintain a consistent length of the welding arc 12 regardless of the wire feed speed at which the welding wire 24 is advanced through the welding system 10. More specifically, the welding system 10 may automatically adjust the welding parameters based on the normalized light intensity to maintain a desired arc length as the wire feed speed of the wire feeder 20 is adjusted. FIG. 6 is a plot 160 showing an example of automatic adjustments to welding parameters that may accompany a change in wire feed speed of the wire feeder 20. The illustrated plot 160 shows welding parameters (ordinate 162) with respect to time (abscissa 164). The welding parameters include the current (trace 166) and the voltage (trace 168) provided to the welding wire 24 for producing the welding arc 12. From time T1 to time T2, the wire feed speed is gradually increased from approximately 240 inches per minute to approximately 600 inches per minute. As the wire feed speed increases, so does the current and the voltage of power supplied to the welding wire 24 via the power supply 16.

In the welding system 10, the normalized light intensity control may enable automatic adjustments of the welding parameters while maintaining a desired welding arc length as the wire feed speed is changed. This may allow an operator to easily set welding parameters because the operator does not have to manually adjust the welding voltage upon adjusting the wire feed speed. This type of automatic control may not be possible using conventional welding systems that provide a constant voltage output in order to maintain a constant arc length. In such systems, the wire feed speed change may affect the relationship between voltage and arc length. Thus, in order to maintain the desired welding arc length, an operator would have to change the voltage setting on the power supply 16 accordingly. The automatic control of both current and voltage using light intensity feedback may improve performance of the welding system 10 in modes where the wire feed speed is altered throughout the welding process. For example, the normalized light intensity may be used to control the welding system 10 operated in a time varying deposition mode, where the wire feed speed is varied periodically to achieve a desired cosmetic appearance of the weld bead.

Figure 7:
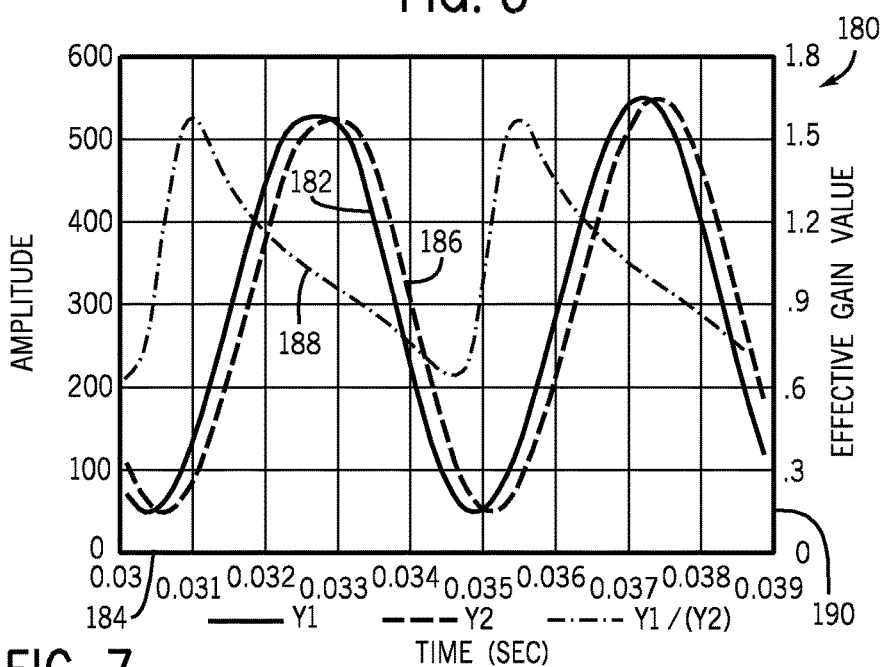
FIG. 7 is a plot of an embodiment of an effective gain value determined based on a phase shift between sensed parameters of the welding system of FIG. 1.

It should be noted that in normalizing the detected light intensity, the output of equation 15 may reduce to equation 16 only if the signal indicative of light intensity and the signal indicative of the welding current are in phase with each other. If the signals received from the sensors 48 and 50 are not in phase, the control circuitry 40 may apply an appropriate gain factor during light intensity normalization. Although the physical parameters of light and current actually occur in phase, the signals produced by the sensors 48 and 50 may be out of phase after electronic filtering applied to the signals via the control circuitry 40. FIG. 7 is a plot 180 showing an effective gain value appropriate for a phase shift between the sensed parameters. A trace 182 represents a first parameter signal (e.g., detected light intensity) with respect to time 184, and a trace 186 represents a second parameter signal (e.g., detected current) with respect to time 184. Another trace 188 represents an effective gain value 190 with respect to time 184, determined by dividing the amplitude of the first trace 182 by the amplitude of the second trace 186. Specifically, the third trace 188 shows the effect of the phase shift between two sine waves (traces 182 and 186) of the same frequency and amplitude. The lagging waveform (trace 186) may represent the effect of RC filtering on the signal indicative of the detected current with a filter time constant of approximately 0.00022 seconds. In the illustrated embodiment, the effective gain value 190 resulting from this division may vary between approximately 0.64 and 1.56 over each period of the sine wave. The control circuitry 40 may be configured to control the effective gain value 190 due to the phase shift between the detected signals in order to perform an accurate normalization of the detected light intensity and to provide stable control of the welding parameters. More specifically, the normalization step may include determining the effective gain value based on the phase shift, dividing the detected light intensity by the detected current, and correcting the divided light intensity according to the effective gain value.

Figure 8:
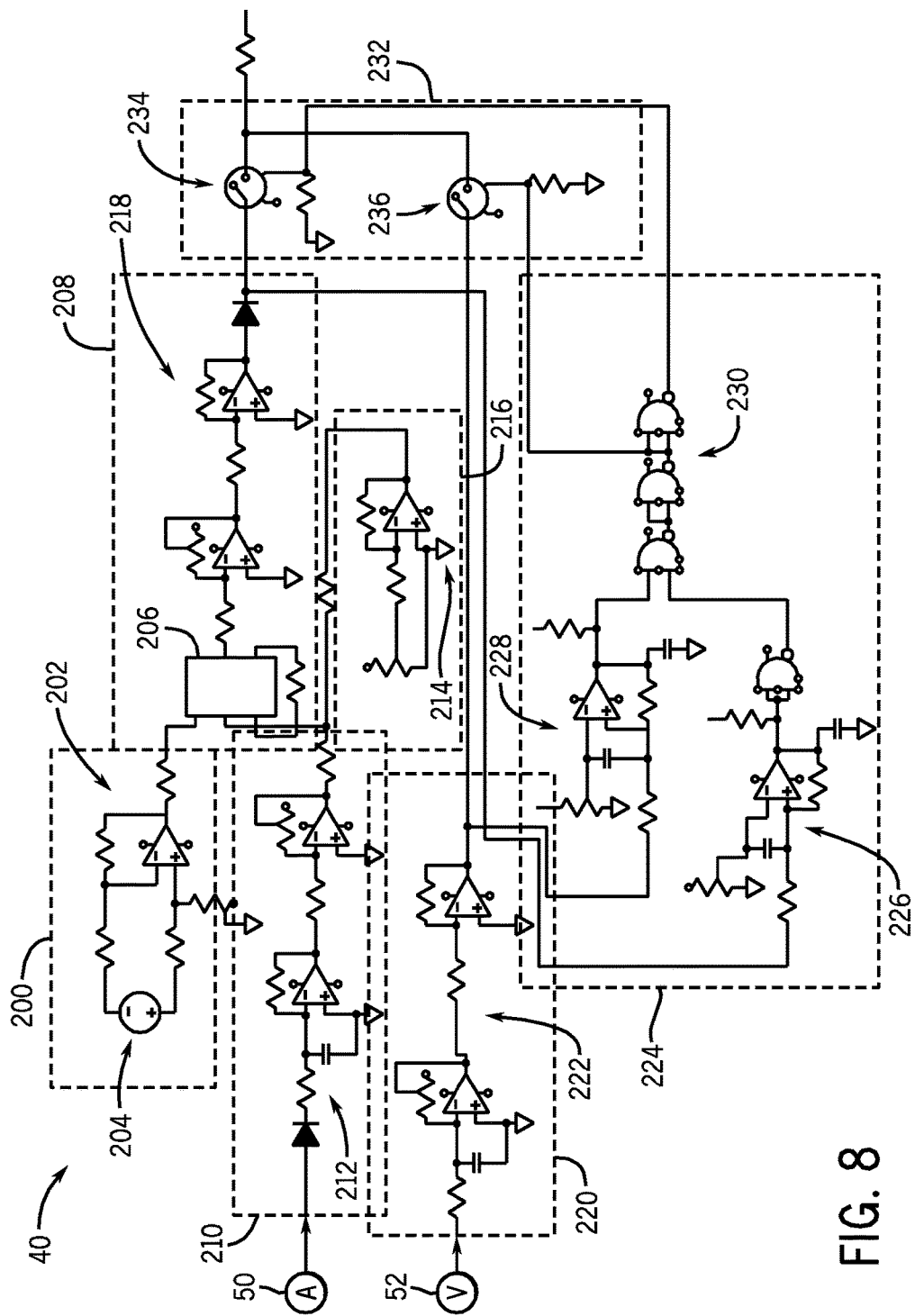
FIG. 8 is a diagrammatical representation of an embodiment of control circuitry used to provide arc light control.

FIG. 8 is a diagram of an embodiment of the control circuitry 40 used to normalize the detected light intensity and to control welding parameters based on the normalized light intensity. The control circuitry 40 is configured to receive signals indicative of the detected light intensity and the detected current, and to provide a control signal to the power supply 16 based at least in part on a normalized light intensity signal. The illustrated control circuitry 40 allows for determining a control signal based on the normalized light intensity, determining a control signal based on a signal indicative of the detected voltage, and switching between the control signals as described in reference to FIG. 5. The control circuitry 40 is divided into a number of blocks that perform different functions. It should be noted that the diagrammed circuitry is exemplary and other combinations of individual circuit components may be utilized to perform the functions described below. In addition, certain functional blocks may or may not be present in some embodiments of the control circuitry 40, depending on factors such as whether the voltage is provided as an input for control, or the type of control executed by the welding system 10.

A first block 200 of the control circuitry 40 may include a high impedance differential amplifier 202 for conditioning an input light intensity signal 204. The signal 204 may be produced by the light sensor 48, as shown in FIG. 1, and input as a voltage drop in the first block 200. The first block 200 may be configured to apply a gain of approximately λ, which corresponds with the number of light elements per unit length of the welding arc 12. The conditioned signal is input to the numerator position of a divider unit 206 in a second block 208 of the control circuitry 40.

A third block 210 of the control circuitry 40 may condition the detected current signal received from the current sensor 50. More specifically, the third block 210 may include a variable gain operational amplifier 212 configured to apply a gain corresponding to η. Once the current signal is conditioned in this manner, it may be provided to the denominator of the divider unit 206 in the second block 208. The illustrated divider unit 206 may be configured to produce an output that is consistent with equation 16 above. In the illustrated embodiment, however, the divider unit 206 receives an additional term γ in the denominator, according to the equation below:

$$L^*_{out}(I_{arc}, I_{arc}) = \frac{\lambda * I_{arc} * \eta * I_{arc}}{\eta * I_{arc} + \gamma}. \tag{17}$$

The additional term γ of equation 17 may be included so that the divider unit 206 does not rail, or generate a maximum output, as the current signal approaches zero. The additional term γ may be set by a potentiometer 214, as shown in a fourth block 216 of the control circuitry 40. In addition to the divider unit 206, the second block 208 may include an operational amplifier 218 to adjust the output of the divider unit 206 to scale the normalized light intensity signal to an appropriate level for input to the power conversion circuitry 42. This may involve scaling the normalized light intensity by λ to determine a signal related to the arc length according to equation 4.

In the illustrated embodiment, the control circuitry 40 is configured to switch between the normalized light intensity feedback and voltage feedback, depending on how the signals relate to predetermined threshold values. Therefore, the illustrated control circuitry 40 also includes a fifth block 220 for receiving the detected voltage signal from the voltage sensor 52 and converting it to a control signal appropriate for input to the power conversion circuitry 42. This may include scaling the voltage signal, via an operational amplifier 222, by β to determine a signal related to the arc length according to equation 3.

A sixth block 224 acts as a logic section for comparing the light and voltage feedback signals with predetermined threshold values, as described in reference to FIG. 5. The sixth block 224 may receive inputs from the second block 208 and from the fifth block 220. The input from the second block 208, which is a control signal based on the normalized light intensity, may be provided to a first comparator 226 to compare the signal with a predetermined threshold value. Similarly, the input from the fifth block 220, which is a control signal based on the voltage, may be provided to a second comparator 228 to compare the signal with a predetermined threshold value. The outputs of the comparators 226 and 228 may then function as inputs to a series of logic gates 230 in the sixth block 224.

A seventh block 232 includes two switches 234 and 236 that may be driven by the logic gates 230 of the sixth block 224 in response to the output of the comparators 226 and 228. For example, the control signal based on the normalized light intensity may be above the predetermined threshold, as determined by the comparator 226, and the control signal based on the detected voltage may be above the predetermined threshold, as determined by the comparator 228. In response to this determination, the logic gates 230 may send a signal to the first switch 234 to close the switch 234, thereby providing the control signal based on normalized light intensity to the power conversion circuitry 42. However, if the light sensor 48 has an obstructed view of the light from the welding arc 12, the control signal based on the normalized light intensity may be below the predetermined threshold, as determined by the comparator 226. At the same time, the control signal based on the detected voltage may remain above the predetermined threshold, as determined by the comparator 228. In response to such inputs from the comparators 226 and 228, the logic gates 230 may provide a signal to the second switch 236 to close the switch 236. This provides a control signal based on the detected voltage to the power conversion circuitry 42 whenever the normalized light intensity signal is corrupted.

Other arrangements of the control circuitry 40 may be possible as well. For example, in certain embodiments the control circuitry 40 may only include the first four blocks 200, 208, 210, and 216 so that control of welding parameters is entirely based on the normalized light intensity. In other embodiments, there may be additional logic for combining the control signals based on the normalized light intensity and based on the voltage to provide a hybrid control signal to the power conversion circuitry 42. In still other embodiments, the control signal based on the normalized light intensity may be used to control a certain welding parameter, and the control signal based on the detected voltage may be used to control a different welding parameter.

Figure 9:
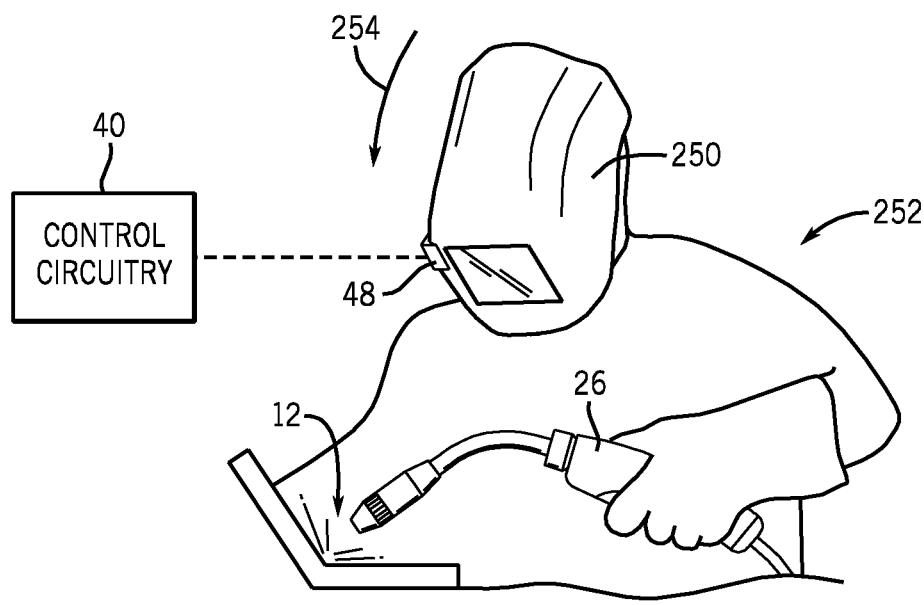
FIG. 9 is a perspective view of an embodiment of a light sensor mounted to a welding helmet for control of welding system parameters.

Present embodiments of the light sensor 48 may be used to control welding parameters in both fully automated and semi-automatic welding systems 10. More specifically, the light sensor 48 may be mounted to the welding torch 26 that is manipulated either robotically or manually by an operator. In certain embodiments where the operator positions the welding torch 26, it may be desirable for the light sensor 48 to be mounted in a location other than on the welding torch 26. As an example, FIG. 9 provides a perspective view of an embodiment of the sensor 48, which is mounted to a welding helmet 250 worn by a welding operator 252. The operator 252 generally maintains an unobstructed view of the welding arc 12, in order to effectively manipulate the welding torch 26 to produce a quality weld. Thus, positioning the light sensor 48 on a forward edge of the welding helmet 250 may ensure an appropriate detection of light emitted from the welding arc 12. As previously discussed, the light sensor 48 may include a single light sensor or an array of light sensors, such as the array shown in FIG. 4.

The light incident on the light sensor 48 is a function of a distance between the light sensor 48 and the welding arc 12. Since the light sensor 48 is not mounted directly to the welding torch 26, the distance between the light sensor 48 and the welding arc 12 may change throughout the welding process. It may be useful, therefore, to detect a distance from the light sensor 48 to the welding arc 12. This may be accomplished in different ways. For example, the light sensor 48 may include or be coupled with a component that measures time-of-flight of sound waves from the welding arc 12 to the light sensor 48. The control circuitry 40 may determine the light intensity based on the light incident on the light sensor 48 and the detected proximity of the light sensor 48 to the welding arc 12. In certain embodiments, the welding system 10 may leave the detected light intensity signal uncompensated with respect to distance between the light sensor 48 and the welding arc 12. In such embodiments, the operator 252 may control the welding arc length by moving (arrow 254) the light sensor 48 on the welding helmet 250 relative to the welding arc 12. This may provide increased control to the operator 250 while maintaining the sensitivity to changes in arc length available through the normalized light intensity feedback. As illustrated, the light sensor 48 may communicate signals to the control circuitry 40 wirelessly. This may be desirable for embodiments where the light sensor 48 is mounted to the helmet 250, so that the operator can move freely relative to the power supply 16.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   an electrode configured to be advanced toward a workpiece;
   a power supply configured to provide a flow of electricity to the electrode for generating a welding arc between the electrode and the workpiece;
   a first sensor configured to sense a light intensity of the welding arc;
   a second sensor configured to sense a voltage provided to the electrode via the power supply; and
   a controller communicatively coupled with the first and second sensors, wherein the controller is configured to control a welding parameter of the welding system based on the light intensity when the light intensity is above a light intensity threshold, and wherein the controller is configured to control the welding parameter based on the voltage when the light intensity is below the light intensity threshold.

2. The welding system of claim 1, wherein the controller is configured to control the welding parameter to maintain an arc length of the welding arc.

3. The welding system of claim 1, wherein the light intensity is directly proportional to an arc length of the welding arc.

4. The welding system of claim 1, wherein the first sensor is mounted on a welding torch, wherein the welding torch is configured to output the electrode toward the workpiece.

5. The welding system of claim 1, wherein the welding parameter comprises the voltage, a current of the flow of electricity provided to the electrode, a wire feed speed, or a combination thereof.

6. The welding system of claim 1, comprising:
a third sensor configured to sense a current of the flow of electricity provided to the electrode via the power supply;
wherein the controller is communicatively coupled with the third sensor and configured to control the welding parameter based on the current when the light intensity is below a light intensity threshold and the sensed current is above a current threshold.

7. The welding system of claim 1, comprising a wire feeder configured to advance the electrode toward the workpiece, wherein the controller is configured to automatically control the welding parameter in response to adjustments of a wire feed speed of the wire feeder.

8. The welding system of claim 1, wherein the first sensor comprises a photovoltaic cell, a photodiode, a photo-resistive element, or some combination thereof.

9. The welding system of claim 1, wherein the first sensor is disposed on a helmet.

10. A welding system, comprising:
control circuitry configured to:
receive a signal indicative of a light intensity of a welding arc between an electrode of the welding system and a workpiece;
receive a signal indicative of a voltage of electricity supplied to the electrode for producing the welding arc; and
provide a control signal to a power supply of the welding system, wherein the control signal is based on the signal indicative of the light intensity when the signal indicative of the light intensity is above a light intensity threshold, and the control signal is based on the signal indicative of the voltage when the signal indicative of the light intensity is below the light intensity threshold.

11. The welding system of claim 10, wherein the control signal, when implemented by the power supply, adjusts at least one of a current, the voltage supplied to the electrode, or a wire feed speed to maintain a desired arc length of the welding arc.

12. The welding system of claim 10, wherein the control circuitry is configured to receive a current signal indicative of a current of the electricity supplied to the electrode, and to provide the control signal based on current signal.

13. The welding system of claim 12, wherein the control circuitry is configured to:
compare the signal indicative of the light intensity to a light intensity threshold value;
compare the signal indicative of the voltage to a voltage threshold value;
determine a first control signal based on the signal indicative of the light intensity;
determine a second control signal based on the signal indicative of the voltage;
provide the first control signal to the power supply when the signal indicative of the light intensity is above the light intensity threshold value; and
provide the second control signal to the power supply when the signal indicative of the voltage is above the voltage threshold value and the signal indicative of the light intensity is below the light intensity threshold value.

14. The welding system of claim 10, wherein the control circuitry is configured to normalize the signal indicative of the light intensity.

15. A welding system, comprising:
an electrode configured to be advanced toward a workpiece;
a power supply configured to provide a flow of electricity to the electrode for generating a welding arc between the electrode and the workpiece;
a first sensor configured to sense a light intensity of the welding arc between the electrode and the workpiece and output a signal indicative of the light intensity of the welding arc;
a second sensor configured to sense a current of electricity supplied to the electrode via the power supply for producing the welding arc and output a signal indicative of the current;
a third sensor configured to sense a voltage of electricity supplied to the electrode via the power supply for producing the welding arc and output a signal indicative of the voltage; and
a controller communicatively coupled with the first, second, and third sensors, wherein the controller is configured to:
receive the signal indicative of the light intensity from the first sensor;
receive the signal indicative of the current from the second sensor;
normalize the signal indicative of the light intensity with respect to the signal indicative of the current;
receive the signal indicative of the voltage from the third sensor;
compare the normalized signal indicative of the light intensity to a light intensity threshold value;
determine a first control signal based on the normalized signal indicative of the light intensity;
determine a second control signal based on the signal indicative of the voltage;
provide the first control signal to the power supply of the welding system when the normalized signal indicative of the light intensity is above the light intensity threshold; and
provide the second control signal to the power supply of the welding system when the normalized signal indicative of the light intensity is below the light intensity threshold.

16. The welding system of claim 15, wherein the first and second control signals, when implemented by the power supply, adjust a welding parameter to maintain a desired arc length of the welding arc.

17. The welding system of claim 16, comprising a wire feeder configured to advance the electrode toward the workpiece, wherein the controller is configured to automatically control the welding parameter in response to adjustments of a wire feed speed of the wire feeder.

18. The welding system of claim 15, wherein the first and second control signals, when implemented by the power supply, adjust at least one of a voltage, the current supplied to the electrode, or a wire feed speed to maintain a desired arc length of the welding arc.

19. The welding system of claim 15, wherein the first sensor comprises a photovoltaic cell, a photodiode, a photoresistive element, or some combination thereof.

20. The welding system of claim 15, wherein the first sensor is mounted on a welding torch, wherein the welding torch is configured to output the electrode toward the workpiece.

* * * * *